(12) United States Patent
DiMartino

(10) Patent No.: US 6,626,534 B1
(45) Date of Patent: Sep. 30, 2003

(54) CONTACT LENS STABILIZATION DESIGN SYSTEM

(76) Inventor: Robert B. DiMartino, 86 Tara Rd., Orinda, CA (US) 94563

( * ) Notice: Subject to any disclaimer, the term of this patent is extended or adjusted under 35 U.S.C. 154(b) by 0 days.

(21) Appl. No.: 09/675,926

(22) Filed: Sep. 29, 2000

(51) Int. Cl.[7] ............... G02C 7/04; G02C 7/02
(52) U.S. Cl. ................... 351/160 H; 351/177
(58) Field of Search ............... 351/176, 160 H, 351/160 R, 161–162, 177

(56) References Cited

U.S. PATENT DOCUMENTS

| | | | | |
|---|---|---|---|---|
| 4,268,133 A | * | 5/1981 | Fischer et al. | 351/161 |
| 5,009,497 A | * | 4/1991 | Cohen | 351/161 |
| 5,483,304 A | * | 1/1996 | Porat | 351/161 |
| 5,500,695 A | * | 3/1996 | Newman | 351/161 |
| 5,998,498 A | * | 12/1999 | Vanderlaan et al. | 523/107 |

FOREIGN PATENT DOCUMENTS

WO    WO-89/07281    *    8/1989

OTHER PUBLICATIONS

Information Brochure, *FreshLook Toric* (disposable contacts for astigmatism), 2000.
Information Brochure, *Focus Toric* (soft contact lenses), 2001.

* cited by examiner

Primary Examiner—Jordan M. Schwartz
(74) Attorney, Agent, or Firm—Niro, Scavone, Haller & Niro

(57) ABSTRACT

A contact lens that is of generally uniform cross-section to allow proper transmission of oxygen-to the eye contains an inner optic region and an outer radial zone. Parallel grooves are placed in the outer radial zone on the anterior surface of the lens to cause the lens to align when the eye is blinked. The grooves can form a fine grating and can be placed in a superior or inferior region of the outer radial zone, or they can be placed in a ring or other configuration in this region.

14 Claims, 2 Drawing Sheets

PERIBALLAST OR
PRISM BALLAST LENS
CROSS-SECTION

THIN-ZONE LENS
CROSS-SECTION

CONTACT LENS STABILIZATION DESIGN SYSTEM

FIELD OF THE INVENTION

This invention concerns contact lenses. In particular, the invention concerns an improved system and design for aligning a contact lens relative to the eye.

BACKGROUND OF THE INVENTION

Hydrogel or 'soft' contact lenses are used to correct refractive errors of the human eye. One type of such lenses is the spherical power hydrogel lens, which is used to correct myopic or hyperopic refractive errors of the eye. In these lenses, the optical power is homogeneous. The rotational orientation of such lenses is non-specific and has no impact on the correction of refractive error. Visual performance of the lens does not suffer from changes in rotational orientation with respect to the eye. In other words, the orientation of the lens in the eye is not important, because the optic zone of the lens itself is radially symmetrical, and not designed to rest on the surface of the eye in a specific orientation.

A second type of more specialized hydrogel contact lenses is required for patients who seek to correct astigmatism refractive errors of the eye using hydrogel contact lenses. Such contact lenses are sometimes referred to a 'toric' contact lenses. Hydrogel lenses that correct astigmatism refractive errors contain a cylindrical power component and a spherical power component. Because the spherical and cylindrical powers are in meridians which are orthogonal to one another, the orientation relative to the eye of a hydrogel contact lens which seeks to correct astigmatism errors in the eye becomes important. The rotational orientation of an astigmatism hydrogel lens in the eye requires alignment along a specific axis. If the rotational orientation of an astigmatic lens is permitted to vary from this axis, visual performance of the lens may suffer, and the desired corrective effect of the lens may be lost. Numerous existing design systems have been used to stabilize astigmatic hydrogel lenses on the eye in an effort to correct the refractive error and maximize visual performance.

The current design systems used to stabilize hydrogel astigmatic contact lenses include prism ballast, periballast and "thin-zone" (shown in FIG. 1). These stabilizing design systems each have at least one characteristic in common. These lens designs have a disparity in thickness between the superior periphery and other regions of the contact lens. The disparity is designed to orient the lens with each blink, as the thinner portion of the lens moves naturally towards the top of the eye with the natural blinking action. Relative to the inferior eyelid, the superior eyelid makes the greatest excursion during the blink. Such a contact lens orients on the eye in a rotational configuration that minimizes resistance to the blink. This orientation is with the "thin zone" in a superior position. The disparity in lens mass between the superior "thin zone" and the thick regions of the lens is directly related to rotational stability on the eye. The greater the difference in lens geometry the more rotationally stable the lens is on the eye. This disparity in thickness is not desirable, however. Such lenses may also be less comfortable due to the disparity in thickness.

In addition, the thicker portions of current design systems for stabilizing contact lenses may interfere with the natural metabolism of the eye. The cornea is the ocular surface upon which hydrogel lenses are worn. The tissue of the cornea requires oxygen to maintain normal metabolism. The cornea is avascular and therefore has no direct blood supply for its oxygen requirement. The major source for corneal oxygen is from the atmosphere. The materials from which hydrogel lenses are fabricated are permeable to gases, and in particular, oxygen. The ability of a particular hydrogel lens to pass oxygen to the cornea from the atmosphere is called oxygen transmissibility. This property is a function of material and thickness. Therefore, hydrogel thickness and oxygen transmissibility are inversely related. Oxygen transmissibility and lens rotational orientation are inversely related with current design systems. Thus, the additional thickness in a hydrogel contact lens used to orient the lens inhibits the transmission of oxygen to the cornea, and interferes with the metabolism of the eye.

Objects and Features of the Invention

The present invention is concerned with providing a novel system for stabilizing the rotational orientation of a contact lens.

Another object of the present invention is to decrease the necessary thickness of material used in contact lenses which require a specific rotational orientation.

Yet another object of the present invention is to increase the comfort level for users of contact lenses which require specific rotational orientation.

Still another object of the invention is to permit the manufacture of contact lenses requiring a specific rotational orientation using a smaller amount of material (such as hydrogel) used in the manufacture of the lens, an advantage which lends itself to mass production of such lenses.

SUMMARY OF THE INVENTION

Accordingly, there is provided a novel system and design for permitting alignment of a contact lens to a given rotational orientation in the eye by the natural blinking action of the eyelid using at least one alignment groove, preferably on the exterior surface of the lens.

DETAILED DESCRIPTION OF THE PREFERRED EMBODIMENT

Figure 1:
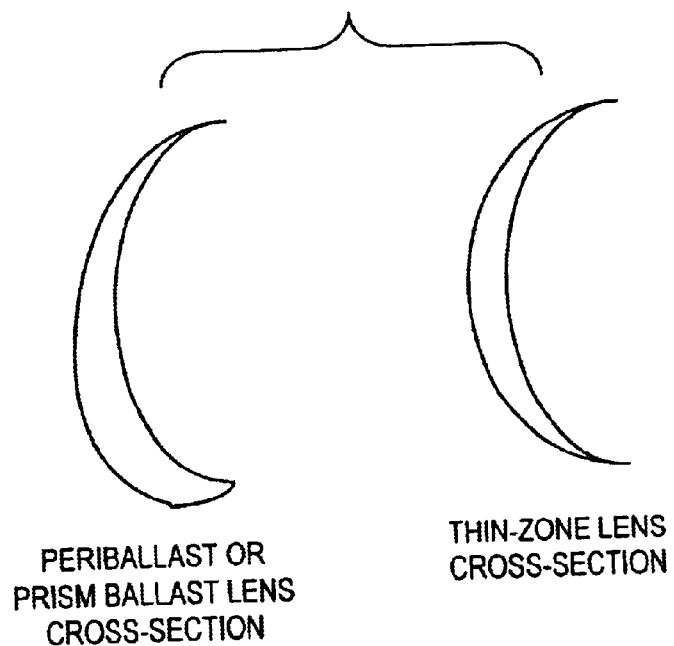
FIG. 1 shows the prior art designs for stabilizing the orientation of a contact lens designed to correct for astigmatism.
Figure 2:
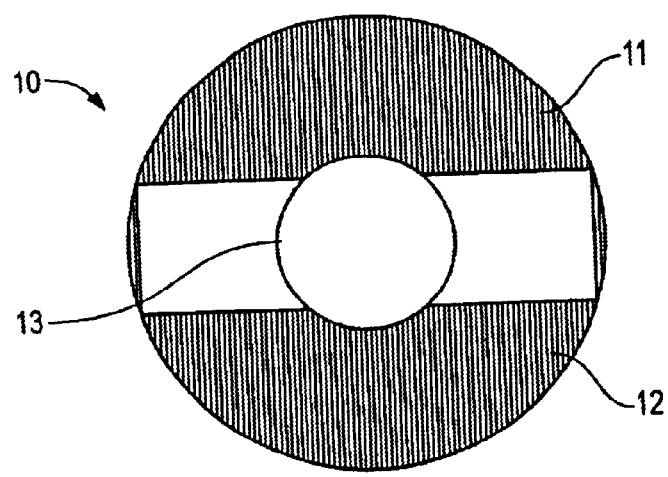
FIG. 2 shows an embodiment of the present invention that stabilizes the orientation of a contact lens using alignment grooves.
Figure 3:
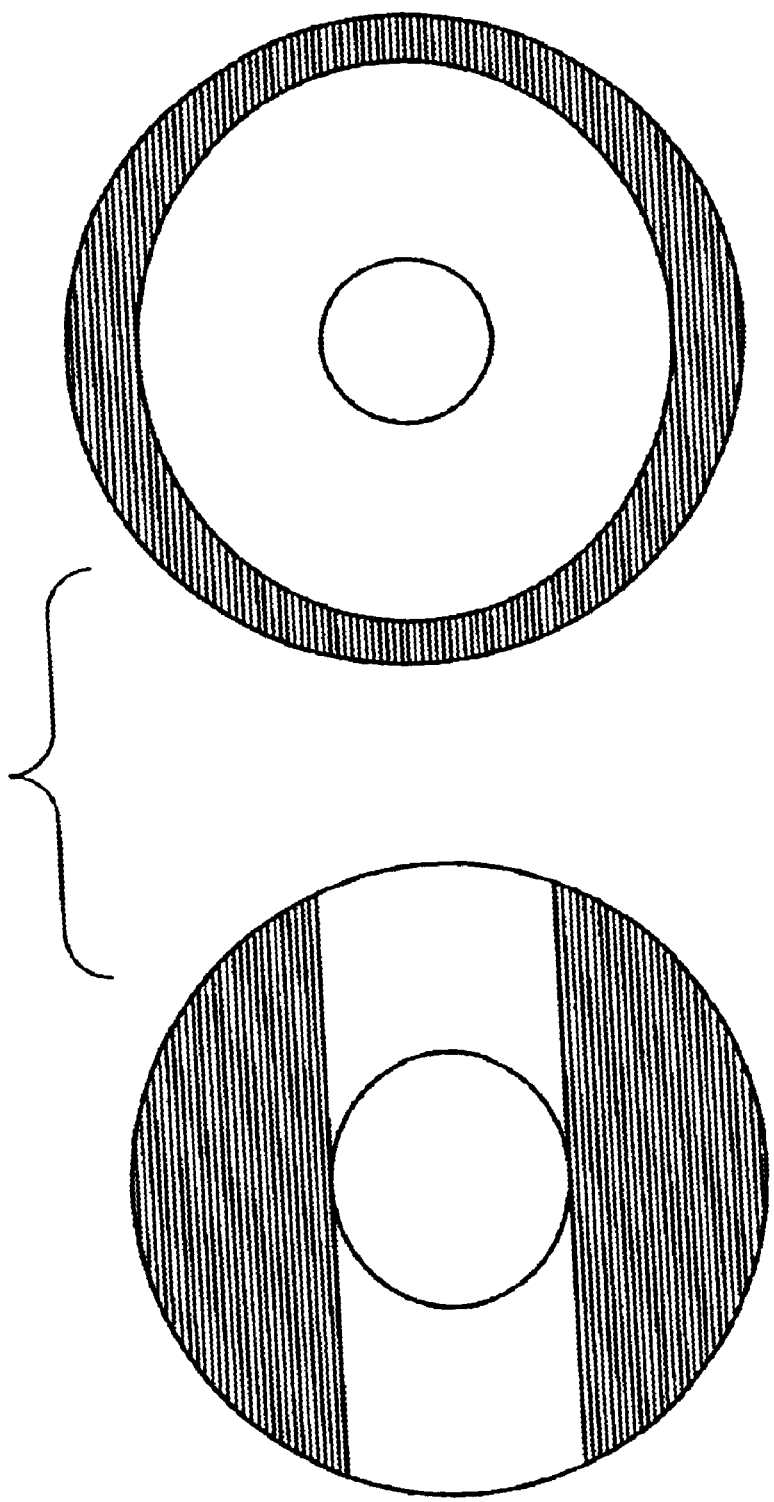
FIG. 3 shows some alternate configurations for the alignment grooves.

FIG. 2 shows the preferred design of a contact lens 10 embodying the invention. In the preferred embodiment the superior alignment grooves 11 are placed on the exterior surface of the contact lens, along with the inferior alignment grooves 12. In the preferred embodiment the optic zone 13, or the portion of the lens that corrects the refractive error of the patient's eye, does not contain alignment grooves. The use of the alignment grooves permits the contact lens to be of substantially uniform thickness and still maintain a specific rotational orientation. It will be understood that some minor variation in lens thickness will not depart from the scope of the invention as long as the primary stabilizing feature is the at least one alignment groove.

The rotational orientation system of the preferred embodiment utilizes the series of channels or alignment grooves

[12] 11 and [13] 12 placed in the anterior periphery of the lens 10. The alignment grooves 12 and 13 are oriented with the axis in the superior—inferior meridian of the lens. An astigmatic contact lens will be properly aligned for correction of astigmatism in two orientations, 180 degrees apart. The alignment grooves permit the alignment of the lens in either rotational orientation.

The alignment grooves of the superior and inferior regions may be variable in width and depth and may depend on the material and size of the contact lens. These grooves could be fabricated by laser etching or in the cast molding process.

Hydrogel contact lenses used for correction of astigmatism are typically manufactured in a cast molding process, which is well understood in the art of contact lens design and manufacture. The contact lens is manufactured by injecting a liquid polymer into a mold. The mold is constructed in such a way that the optic zone 13 of the lens will correct a specific vision fault. In the preferred embodiment, the alignment grooves will be created by constructing the mold by placing ridges on the mold in such a manner that the grooves will be molded into the lens as the polymer hardens. When the polymer has solidified into the hydrogel lens, the lens is removed from the mold.

In addition, the alignment grooves could be etched onto a lens after formation and construction using a laser or other etching tool.

During the blink the underside of the eyelids, or conjunctival surface, would orient the hydrogel contact lens to minimize resistance. This rotational orientation would be along the axis of the orientation grooves. Because the grooves are providing the orientation, the contact lens may be of substantially uniform thickness. This permits the manufacture of the lens to be performed using less material, and achieves the other objectives of the invention, including thinner lenses for passage of oxygen to the cornea, less irritation of the eye due to variable thickness of lens, and facilitation of mass production through minimization of cost due to the decrease in material used.

It will be readily apparent to those of ordinary skill in the art that such alignment technique can be used for any contact lens that requires alignment along a specific axis. Such applications include special effects or cosmetic effect contact lenses, contact lenses used to facilitate a display to the eye, or any contact lens requiring orientation along a specific axis.

It will be apparent.to those of ordinary skill in the art that many changes and modifications could be made while remaining within the scope of my invention, including the aforementioned use of different techniques for forming the alignment grooves, as well as different placement or number of alignment grooves.

What is claimed is:

1. A soft contact lens system for a human eye, said human eye having an eyelid with a conjunctival surface, the system comprising:

a lens with an anterior and posterior surface of generally uniform cross-section thin enough to provide sufficient oxygen transmissibility for said eye, the lens having an optic zone with a predetermined surface and an outer radial zone, said outer radial zone having a superior region and an inferior region;

a plurality of parallel alignment grooves located on the anterior surface of said outer radial zone in at least one of said superior or inferior regions, said alignment grooves causing said lens to orient by minimizing resistance between said lens and said conjunctival surface when said eye is blinked, whereby said lens is oriented in a direction along said alignment grooves.

2. The soft contact lens of claim 1 wherein said alignment grooves are located in both said superior and said inferior region.

3. The soft contact lens of claim 1 wherein said plurality of alignment grooves forms a grating.

4. The soft contact lens of claim 1 wherein said lens is a hydrogel lens.

5. A contact lens for an eye, said eye having an eyelid with a conjunctival surface, said contact lens comprising:

a lens with an anterior and posterior surface of generally uniform cross-section thin enough to provide sufficient oxygen transmissibility for said eye, the lens having an optic zone with a predetermined surface and an outer radial zone;

parallel groove means located in said outer zone for causing said lens to orient by minimizing resistance between said lens and said conjunctival surface when said eye is blinked.

6. The contact lens of claim 5 where said lens is a soft contact lens.

7. The contact lens of claim 6 wherein said lens is a hydrogel lens.

8. The contact lens of claim 5 wherein said parallel groove means is located in an annular ring in said outer radial zone.

9. The contact lens of claim 5 wherein said parallel groove means is a grating.

10. A method of aligning a contact lens in a human eye, the human eye having an eyelid with an inner surface comprising the steps of:

preparing a contact lens with an inner radial optic zone and an outer radial peripheral zone, said inner radial optic zone having an anterior surface shaped according to a particular optical design, the outer radial peripheral zone also having an anterior surface;

placing a plurality of parallel grooves in the form of a grating on the anterior surface of said outer radial peripheral zone;

causing said contact lens to be placed in a human eye, said plurality of parallel grooves causing said lens to properly orient by minimizing resistance with said inner surface of said eyelid when the eye blinks.

11. The method of claim 10 wherein said contact lens is a soft contact lens.

12. The method of claim 11 wherein said soft contact lens is hydrogel.

13. The method of claim 10 wherein said grating is placed on at least one of an superior or an inferior region of said outer peripheral zone.

14. The method of claim 10 wherein said grating is placed in an annular ring in said outer peripheral zone.

* * * * *